Inventor
Richard J. Henry

United States Patent Office 3,441,828
Patented Apr. 29, 1969

3,441,828
SCR PHASE RESPONSIVE POWER CONTROL CIRCUIT HAVING EXTENDED ANALOG RANGE
Richard J. Henry, Escondido, Calif., assignor, by mesne assignments, to DoAll Company, Des Plaines, Ill., a corporation of Illinois
Filed Feb. 17, 1965, Ser. No. 433,266
Int. Cl. H02p 7/24; G05b 11/26; H01c 1/14
U.S. Cl. 318—345
2 Claims

ABSTRACT OF THE DISCLOSURE

A motor control circuit including a pair of silicon-controlled rectifiers for controlling the power in each direction of motor rotation. The second silicon-controlled rectifier of each pair extends the controllable power range of the circuit. The first SCR is fired at a controllable firing angle to provide a pulsating current in the motor. The firing pulse is also applied to the gate of the second SCR and the pulsating current is applied across anode-cathode of the second SCR. A resistance in parallel with the second SCR limits current to the motor when the firing angle of the first SCR is large. However for small firing angles of the first SCR, the pulsating current applied to the second SCR is large enough to cause it to fire thereby shorting the resistance and increasing the power applied to the motor.

---

This invention relates to silicon-controlled rectifier circuits for controlling the amount of power supplied to an electric motor or other load.

The use of silicon-controlled rectifier circuits for motor control purposes is not new, but heretofore these circuits controlled the power supplied to the motor by simply applying either a full wave rectified voltage or a half-wave rectified voltage to the anode-cathode circuit of a silicon-controlled rectifier by which the current to the motor was regulated, and gating the rectifier at selected times.

Each half-wave of the signal applied to the anode-cathode circuit of a silicon-controlled rectifier represents 180° of a full cycle. The signal applied to the gate of the silicon-controlled rectifier to render the rectifier conductive to pass current to a load may be impressed thereon at any instant in this half-wave, so that theoretically the silicon-controlled rectifier may be turned on at any point between 0° and 180° of the signal on the anode-cathode circuit. The point at which the silicon-controlled rectifier is turned on is known as the firing angle and is measured by degrees of the half-cycle signal on its anode-cathode terminals. For example, if the proper gating voltage is applied to the gate electrode of a silicon-controlled rectifier when the signal on the anode-cathode electrodes has passed through one-quarter of a full cycle, the firing angle would be said to be at 90°. A 90° firing angle is illustrated in FIGURE 2B, which will be explained hereinafter.

When the SCR fires, the signal on the gate loses control of the SCR and the SCR will not turn off, i.e. stop conducting, until the anode-cathode voltage returns to 0 volts. Consequently, the smaller the firing angle, the greater the amount of current the SCR will pass to the load, and of course the greater will be the load driving power; and, conversely, the greater the firing angle, the lower will be the amount of power supplied to the load. The amount of power supplied to a load thus may be controlled by varying the firing angle of the silicon-controlled rectifier, and while the firing angle may be theoretically varied between 0° and 180°, to achieve an analog power control variation in firing angle must be limited to between 20° and 160°. This follows from the fact that at firing angles less than 20° and greater than 160°, the cathode-gate voltage is not at a sufficiently positive potential with respect to cathode-anode voltage to insure reliable or dependable firing.

The range through which the firing angle of the SCR can be varied and still have reliable firing thus sets the limits of the power range of the circuit. To give an example, with the firing angle at 20°, the power delivered by a given circuit might be 50 watts, while with the firing angle at 160°, the power delivered would be .1 watt.

While a power range of 50 watts down to .1 watt may be wide enough and perfectly satisfactory for some purposes, there exists an ever increasing demand for a broader analog controlled power range. One such area in which a broader or wider power range is needed is in the field of extremely precise measuring machines wherein certain structural elements of the machine must be moved minute distances between very accurately set points to accomplish the purpose of the machine. One way of effecting such closely controlled motion is with a lead screw directly coupled to a rotor of a D.C. reversing motor of the type which has no preferred rotor setting with respect to the stator and in which the rotor has very little inertia. Such motors have constant starting torque from any rotor position and also very little starting inertia; and because of these attributes they can be driven at extremely low speeds and very quickly stopped and reversed, provided the appropriate current wave form is applied thereto; and if the power supplied is ample, they can also be driven at fairly fast speeds to produce relatively rapid traverse of the parts moved thereby.

This calls for a power supply control for the motor with a range heretofore never achieved, a range which is considerably wider than that attainable with known SCR circuits. It also requires being able to stop the motor at any instant, independent of the phase angle of the applied pulsing current—which heretofore could not be done with an SCR control circuit. But SCR circuits are ideal for the control of D.C. motors and other electrically powered instrumentalities that may be similarly controlled, because of the high efficiency and small physical space requirements of SCR control circuits. Therefore, if the power range of the SCR circuit could be expanded, and if it could be operated so as to at least produce the effect of polarity reversal of the applied voltage, independent of the cathode-anode phase angle, i.e. if the conducting SCR could be turned off or its effect could be overcome before the end of a conduction cycle, the answer to the problem would be had. This invention has attained that goal.

Stated in terms of its objectives, it is therefore a primary object of this invention to expand or broaden the range through which an SCR circuit can reliably deliver or supply precisely controlled power, and—more specifically—to reduce the lower limit of that range, without changing or in anywise affecting its upper limit.

Another very significant object of this invention is to provide an improved and more complete control over the conductivity of an SCR, to the end that the effect of its conductivity can be terminated and overcome before the end of a conduction cycle.

Another object of this invention is to provide an SCR circuit which not only is capable of reliably and dependably delivering power to drive a load at speeds much slower than heretofore possible, but which at the same time can produce torque sufficient to balance the load and then drive it at the selected slow speed. To those well skilled in the art, this means optimum current shaping.

A further object of this invention is to provide an SCR circuit of the character described and for the purpose set forth, in which the direction of rotation of a D.C. reversible motor supplied with power by the control circuit may be governed by a plurality of reversing switches which can be operated independently of one another, or simultaneously with no objectionable effects, and wherein the speed at which the motor runs is determined not only by which one or more of the several switches is closed, but also by the direction of rotation which the closed switches call for. In other words, this invention contemplates a motor-control circuit wherein motor speed and its direction of rotation can be determined by a number of different factors, each exerting its own influence upon the control circuit in concert with the others or independently thereof.

It is also an object of this invention to provide an SCR circuit which when used to control the power supplied to a D.C. motor, inherently maintains the speed of the motor constant at whatever value the factors governing the functioning of the circuit call for.

Still another object of this invention is to provide an SCR circuit for the purpose set forth which is foolproof and immune to damage due to failure of any of its components.

With the above and other objects in view which will appear as the description proceeds, this invention resides in the novel combination and arrangement of circuit elements and components substantially as hereinafter described and more particularly defined by the appended claims, it being understood that such changes in the precise embodiment of the herein disclosed invention may be made as come within the scope of the claims.

The accompanying drawings illustrate two complete examples of the physical embodiments of the invention, according to the best modes so far devised for the practical application of the principles thereof, and in which.

Figure 1:
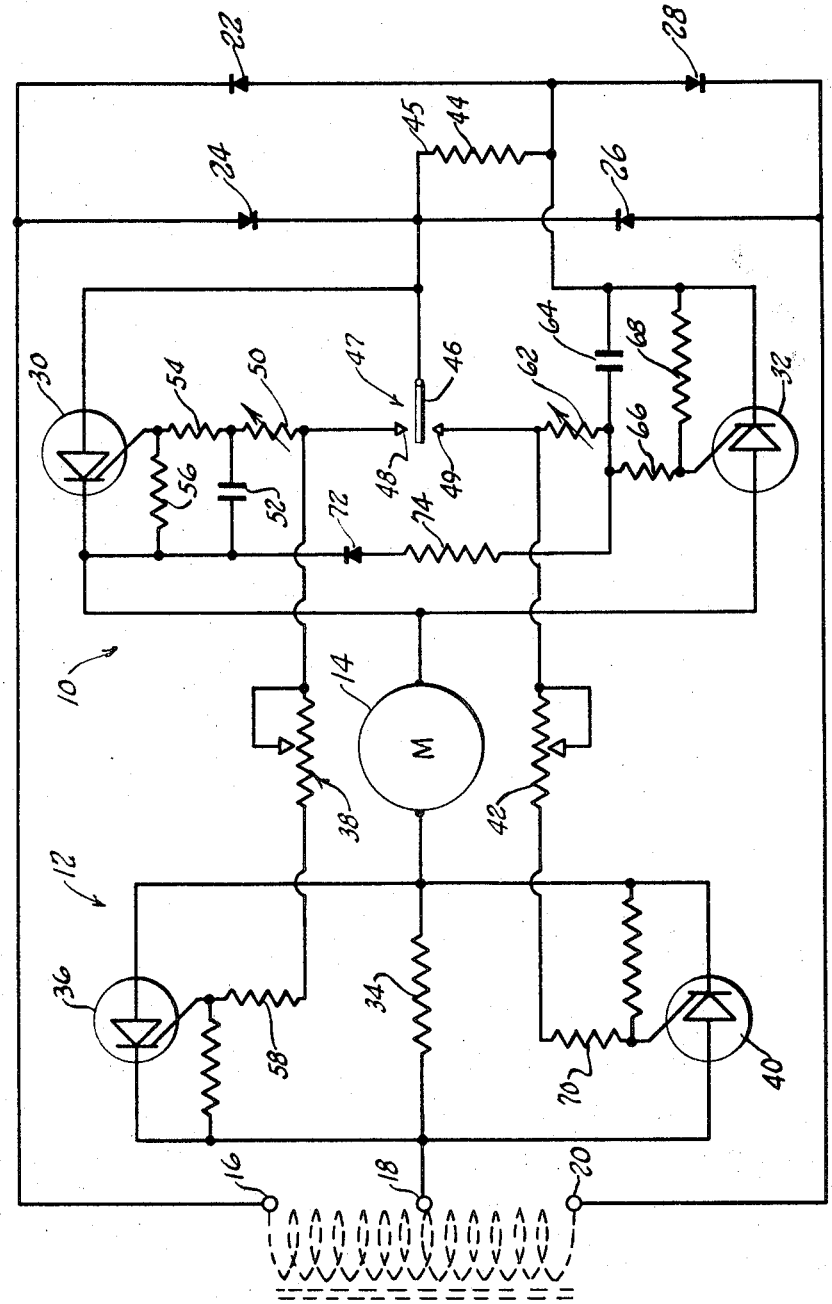
FIGURE 1 is a schematic diagram illustrating one embodiment of the control circuit of the invention.
Figure 3:
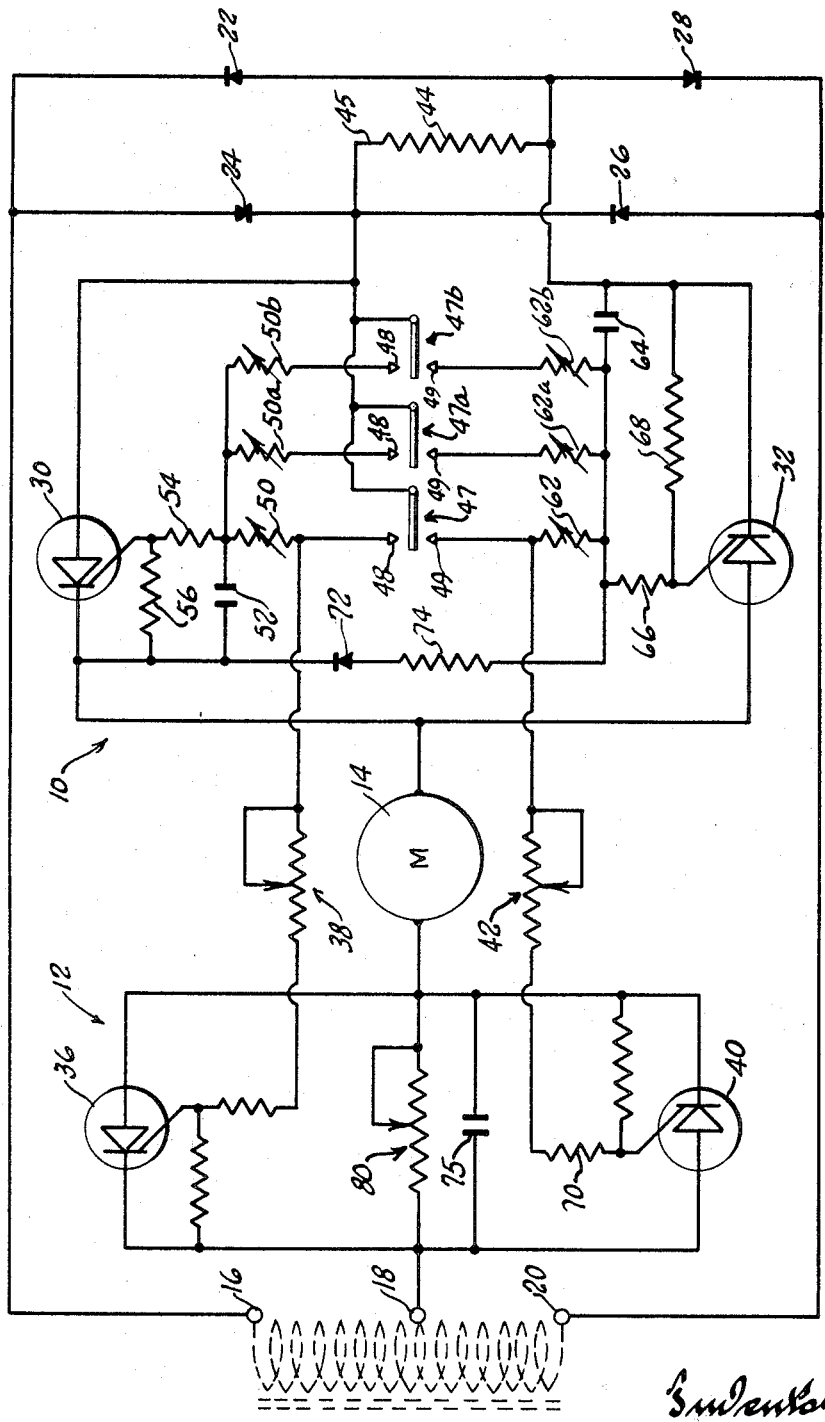
Figure 4A:
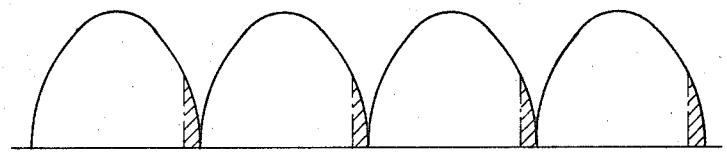
Figure 4B:
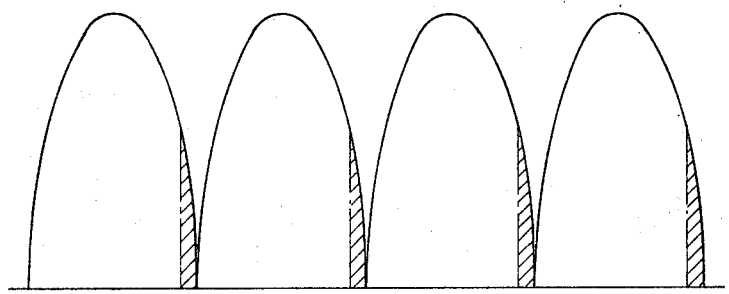
Figure 4C:
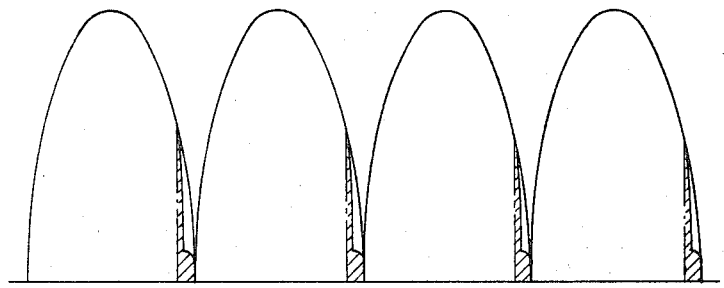

FIGURE 3 is a schematic diagram illustrating a modified embodiment of this invention, which differs from that shown in FIGURE 1 in that it enables the functioning of the motor to be dictated by a plurality of factors acting in concert or singly, and also in its provision of means for increasing the driving torque at low motor speeds; and FIGURES 4A through 4C are graphs of wave forms helpful in explaining how the modified version of the control circuit achieves high driving torque at low motor speeds.

In the circuit of this invention, as depicted in FIGURE 1, a primary SCR circuit 10 and a secondary SCR circuit 12 coact to supply power to a D.C. reversible motor 14. Input terminals 16, 18 and 20 connect the circuit with an A.C. power source which may be the secondary of a transformer as shown in dotted lines in FIGURE 1. Since terminal 18 is a center tap on the transformer secondary, its polarity never changes, but during one-half of the A.C. cycle it is positive with respect to the terminal 16 and negative with respect to the terminal 20, while in the next cycle it is negative with respect to the terminal 16 and positive with respect to the terminal 20.

Diodes 22, 24, 26 and 28 are connected with the terminals 16, 18 and 20, to supply full wave low impedance rectified current to the motor 14 when either of two silicon controlled rectifiers 30 or 32 is conductive. The direction in which the motor turns depends upon which of the SCR's 30 or 32 is conductive and its speed depends upon the firing angle at which the selected SCR is rendered conductive.

With the SCR 30 conductive and terminal 16 positive, motor energizing current flows through diode 24 and SCR 30 to one side of the motor. The other side of the motor is connected with the center terminal 18 through the secondary circuit 12, which means that the circuit is completed either through a voltage dropping resistance 34 or through SCR 36, depending upon the firing angle at which SCR 30 is rendered conductive, and the setting of a variable resistor 38 by which the voltage at the gate electrode of the SCR 36 may be adjusted, as will be hereinafter more fully described.

During the next half-cycle of the A.C. voltage source when the terminal 20 is positive, the motor energizing current flows through diode 26 and SCR 30 to one side of the motor, and from the other side thereof to center terminal 18, either through the voltage dropping resistance 34 or the SCR 36. It should be noted that during both half-cycles, the motor energizing current flows in the same direction so that the rotor of the motor continues to turn in the same direction until SCR 30 no longer fires or until SCR 32 fires and becomes conductive and supplies power to the motor, tending to or actually driving the same in the opposite direction.

When SCR 32 is conductive, a low impedance path exists for the flow of motor energizing current in the direction opposite to that which flows through SCR 30. This low impedance path, beginning with center terminal 18 and assuming the cycle to be in its phase at which terminal 20 is negative, leads to one side of the motor through either the voltage dropping resistance 34 or SCR 40, depending upon the firing angle of SCR 32 and the setting of a variable resistor 42 by which the voltage at the gate electrode of the SCR 40 may be adjusted. From the other side of the motor the circuit continues through SCR 32 and diode 28 to terminal 20. During the next half-cycle when terminal 18 is positive with respect to terminal 16, the circuit beyond SCR 32 is completed through diode 22. Again, during both half-cycles, the current to the motor is unidirectional.

It should be understood that the motor 14, in addition to being of the D.C. reversible type, should have a very low inertia rotor and a stator-rotor relationship approaching that of a homopolar motor. Unless the motor does have these characteristics, it will not respond as promptly or be as precisely controllable by the circuit of this invention as it should be if the full capabilities of the invention are to be realized.

The full wave bridge comprising the diodes 22 and 26 which conduct current during one-half of the cycle and the diodes 24 and 28 which conduct during the next half-cycle of the A.C. voltage source, together with a resistance 44, provide in phase high impedance or low current triggering voltage of a value determined by the resistance 44, for all of the SCR's in the circuit.

The resistance 44 is so connected with the diodes that one side 45 thereof is always positive. This side of the resistance is connected with the contactor 46 of a direction selecting switch 47. The contactor 46 is selectively engageable with either of two contacts 48 and 49. When the switch is closed to contact 48, trigger current can flow to the gate electrode of SCR 30 through a phase shift or phase lag circuit comprising variable resistor 50, capacitor 52 and fixed resistors 54 and 56, and also the gate electrode of SCR 36, through variable resistor 38 and fixed resistor 58, which together determine the relationship between the gate voltage and the cathode-anode voltage of SCR 36; and when the switch is closed to contact 49, trigger current can flow to the gate electrode of SCR 32 through a phase shift or phase lag circuit comprising variable resistor 62, capacitor 64 and fixed resistors 66 and 68, and also to the gate electrode of SCR 40 through variable resistor 42 and fixed resistor 70.

Variable resistors 50 and 62 may be potentiometers, rheostats, or groups of fixed resistors selectively inserted into the phase shift or phase lag circuits. In any event, the adjustability of the phase shift or phase lag circuits, and in the circuits as herein illustrated, the adjustability of the variable resistors 50 and 62 enables the firing angle of the SCR's 30 and 32 to be changed, either directly or indirectly by whatever factor or condition is to determine the speed at which the motor is to run.

To isolate the SCR's 30 and 32 and thereby prevent them from firing simultaneously, even though only one of them is turned on, a series connected diode 72 and a resistance 74 is connected between the two phase shift or phase lag circuits.

It will now be seen that if the switch contactor 46 is engaged with contact 48, SCR 30 will fire and become conductive to deliver power to the motor of a magnitude depending upon the firing angle at which SCR 30 became conductive, and this, as noted, is determined by the adjustment of variable resistor 50. This will produce rotation of the motor armature in one direction. By the same token, if the switch contactor 46 is engaged with contact 49, SCR 32 will fire and deliver power to the motor to cause the same to run in the opposite direction and at a speed depending upon the firing angle at which SCR 32 became conductive.

Concomitantly with the supply of triggering current to the gate electrode of SCR 30 or 32 to render the selected SCR conductive to supply power to the motor and cause it to run in the forward or reverse direction depending upon which of these SCR's was activated, triggering current is also supplied to the gate electrode of the associated SCR 36 or 40. This current is in phase with the pulsing current delivered to the motor by the conductive SCR 30 or 32, and has a value determined by series-connected variable resistor 38 and fixed resistor 58 in the case of SCR 36, and by series connected variable resistor 42 and fixed resistor 70 in the case of SCR 40. When either SCR 36 or 40 fires the voltage dropping resistor 34 will be shunted out of the circuit so that full power can be supplied to the motor; but these SCR's will not fire unless their cathode-anode voltage is in excess of a predetermined magnitude, and this occurs only when their respective SCR 30 or 32 is conducting power in the upper portion of its range—as, for instance, when its firing angle is less than 90°. It is, of course, at this time that the voltage dropping resistor should be shunted.

When the circuit is operating in the lower portion of its power range, the SCR's 36 and 40 do not fire, and as a result the voltage dropping ressitor 34 is in the motor circuit to increase its impedance and reduce the amount of power delivered to the motor, so that when the firing angle of the SCR's 30 and 32 is at the maximum permissible setting—namely, 160°—the power delivered to the motor will be at a level substantially lower than that which can be reliably achieved by simply controlling the firing angle of the SCR's.

The values of the resistors 54, 56, 66 and 68 may be chosen to accommodate the normal differences in the individual silicon-controlled rectifiers, and if desired these resistances may be provided by thermistors so as to compensate for changes in the silicon-controlled rectifiers due to temperature variations.

While the foregoing description may be sufficient for those skilled in the art to understand how the circuit of this invention achieves its purposes, to assure against any misunderstanding, the operation of the circuit will now be described with relation to the graphs shown in FIGURE 2.

Figure 2A:
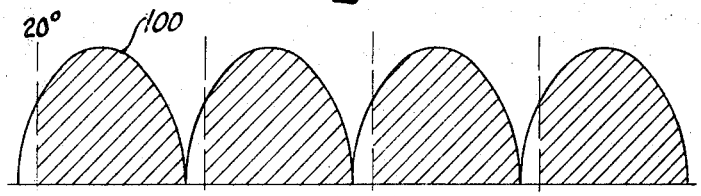
FIGURES 2A through 2D are graphs of waveforms helpful in explaining the operation of the circuit illustrated in FIGURE 1.

The A.C. power across input contacts 16 and 18 during one-half cycle and across input contacts 20 and 18 during the next half-cycle is rectified by the full wave rectifier comprising the diodes 22 through 28 and results in a pulsating signal of relatively high voltage having the wave form designated 100 in FIGURE 2A. This signal, which provides the motor driving current, is applied across the anode-cathode circuits of all of the SCR's in the circuit, but unless the switch 47 is closed to engage its contactor 46 with either contact 48 or 49, nothing takes place, i.e. motor driving current does not flow to the motor. But now, if the switch contactor is engaged with contact 48, the positive voltage seen at the junction of diodes 24 and 26 and side 45 of resistance 44, appears at the gate electrodes of the SCR's 30 and 36. This signal, the magnitude of which is substantially less than that of the motor driving current, being dependent upon the value of the resistance 44, is in phase with the anode-cathode current at SCR 36, but at SCR 30 it lags in phase by an amount determined by the phase shift or phase lag circuit 50, 52, 54 and 56, through which the signal is applied to the gate electrode of SCR 30. The instant in the cycle at which current appears at the gate of SCR 30 and causes it to fire and become conductive to pass current to the motor, thus is determined by the setting of the variable resistor 50 of the phase shift or phase lag circuit. In other words, the firing angle of SCR 30 is controlled by the variable resistor 50 and its adjustment can be a function of one of the factors of the instrumentality of which the motor 14 constitutes a part.

There is no such delay in the appearance of triggering current at the gate electrode of SCR 36, but that SCR will not fire unless the voltage across its anode-cathode reaches a predetermined level which can occur only when the firing angle of SCR 30 is such as to cause it to deliver power in the upper portion of its range.

With the switch contactor 46 engaging the contact 48, the motor thus runs in one direction which may be forward, and at a speed depending upon the firing angle at which SCR 30 becomes conductive.

Figure 2B:
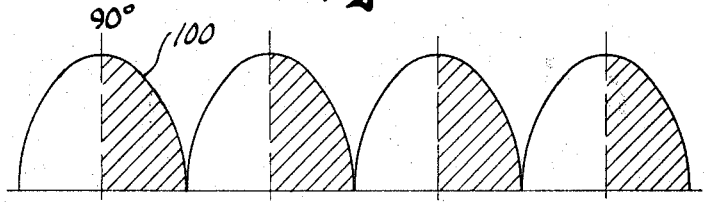
Figure 2C:
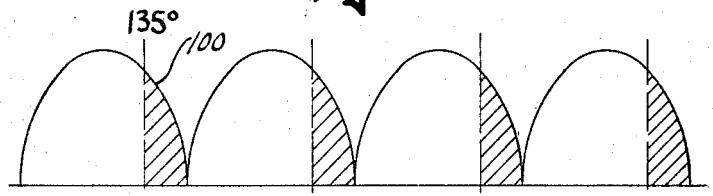
Figure 2D:
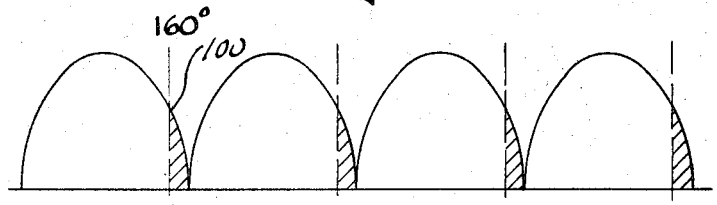

In FIGURE 2A, the firing angle of SCR 30 is indicated to be at 20°. After SCR 30 fires, it will conduct until the signal 100 is reduced to 0 volts. The conduction time is indicated by the shaded portion of the half-cycle. FIGURE 2B is similar to FIGURE 2A except that the firing angle is indicated to be at 90°. FIGURES 2C and 2D show the firing angles to be at 135° and 160°, respectively. The firing angle may be varied between 20° and 160° by adjusting the value of resistance 44, and as shown in FIGURE 2, the greater the firing angle the lower the conduction time of SCR 30 and the lower the amount of power supplied to motor 14 and vice versa.

Without the secondary SCR circuit 12, the analog power range of the circuit would be, by way of example, between 50 watts at a 20° firing angle of SCR 30 and 0.1 watt at a 160° firing angle of SCR 30. With this invention, the power range is extended or increased at its lower limit by the addition of the voltage dropping resistance 34 in series with the motor armature. This effects an increased motor impedance and hence lowers the minimum power that can be delivered—for instance, to a few milliwatts; and to avoid a corresponding reduction of the maximum power, SCR 36 which shunts the dropping resistance 34, is gated "on" when added power is necessary. The upper level or limit of the power range is thus maintained at 50 watts. The gating voltage of SCR 36 is preset by adjusting the value of the variable resistance 38.

The operation of the circuit during reverse rotation of the motor, which is effected by actuation of the switch 47 to bring its contactor 46 into engagement with contact 49, is the same as described for forward rotation, except that in this case it is SCR's 32 and 40 and their associated circuitry which is involved.

For a constant input signal and a set value of resistance at the variable resistors 50 (for forward rotation) and 62 (for reverse rotation) the adjustable resistors 38 and 42 serve as speed controls for the motor. To illustrate, when added power is necessary due to either an added load on the motor or a motor speed loss, the counter EMF of the motor is reduced. This reduced counter EMF lowers the motor impedance and allows an increased voltage drop across dropping resistance 34. The new impressed voltage across resistance 34 is manifested at the secondary SCR's 36 and 40 as an increase in anode voltage, and since the secondary SCR's 36 and 40 have a preset trigger level at their gate electrodes at all times, this increase in anode voltage will cause the involved secondary SCR (36 or 40) to fire until the motor counter EMF again reduces its anode voltage. The firing of either SCR 36 or 40, as already noted, lowers the impedance between the motor 14 and contact 18, allowing increased current and power to be supplied to the motor.

Normally, as is well known, when a motor is operated at low power to cause it to run at low speed, driving torque suffers. But it is at this very time that high torque is vitally needed. To accomplish this desirable result is an objective of this invention that is achieved by momentarily shunting the dropping resistor 34 during each half-cycle by means of an A.C. capacitor 75, as shown in FIGURE 3. By properly selecting the value of this capacitor with relation to the value of the resistor 34 and the motor load requirements, i.e. by proper matching of the R.C. times to motor load requirements, increased torque can be obtained with little or no change in set speed. As an example, with a capacity of 200 μfd. for the capacitor 75 and five ohms of resistance in the resistor 34, the voltage dropping resistance will be removed from the motor circuit for one millisecond. This is but a fraction of the time during which SCR 30 or 32 would be conductive with the firing angle set at 160°. The effect of this momentary removal of the dropping resistance from the motor circuit can be better appreciated from a consideration of the graphs shown in FIGURE 4.

FIGURE 4A illustrates the wave form of the pulsating unidirectional current as it would appear in the circuit of FIGURE 1 at the anode-cathode terminals of SCR's 30 and 32 when the secondary SCR's 36 and 40 are not firing, or in other words, when the voltage dropping resistance is not being shunted out of the circuit and with the firing angle at 160°. FIGURE 4A should be compared with FIGURE 4B which illustrates a wave form which would be obtained with the circuit of FIGURE 1, if at a 160° firing angle the dropping resistance was shunted. Note the difference in amplitude between these two wave forms. Because of this increased amplitude, the power delivered to the motor by the wave form of FIGURE 4B would be greater than it is with the wave form of FIGURE 4A, despite the fact that the duration of conductivity in each cycle, as depicted by the shaded areas, is the same in both wave forms.

It should be understood though, that with the circuit of FIGURE 1 the dropping resistance is not shunted out of the motor circuit at a 160° firing angle for SCR's 30–32. The wave form at FIGURE 4B is, therefore, only theoretical and has been included merely to help visualize how the modified embodiment of the invention illustrated in FIGURE 3 can produce high torque at low speed.

FIGURE 4C illustrates the wave form obtained with the modified embodiment of the invention shown in FIGURE 3, as a result of the capacity shunting of the dropping resistance. When current is conducted to a capacitor in its discharged state, it initially behaves as a dead short, but as it begins to charge, the current it passes drops at a rate depending upon the capacity of the capacitor and the voltage of the applied current. Hence, when the SCR's 30–32 are "gated on" in FIGURE 3 at a 160° firing angle (at the lower end of their power range) although the secondary SCR's 36–40 do not fire, the dropping resistance 34 is shunted out of the circuit by the capacitor 75, so that the initial power delivered to the motor by each current pulse does not have the amplitude depicted by the shaded area in FIGURE 4A, but rather that of FIGURE 4B. However, since the shunt path provided by the capacitor rapidly increases in impedance due to the charge being built up in the capacitor, the pulsating current delivered to the motor has the wave form of FIGURE 4C—namely, a high sudden but rapidly declining peak followed by a slowly declining low level of current. Obviously, of course, the capacitor 75 is charged and discharged during each cycle.

The wave form of FIGURE 4B depicts a condition which really never can exist with the circuit of FIGURE 1, i.e. complete elimination of the voltage dropping resistance 34 at a 160° firing angle. However, a comparison of the wave form of FIGURE 4B with that of FIGURE 4C illustrates how the shunting of the dropping resistance by a capacitor combines sufficient power to give the motor the torque it may need to initiate movement of the load, with a level of power low enough to drive it at the desired slow speed. The result accomplished by this feature of the invention might be likened to a scale balance in which the total inertia load on the motor is at one side of the fulcrum and the momentarily applied high level of power during each cycle, depicted by the sharp peaks in the shaded areas of FIGURE 4C, is at the other side of the fulcrum. Since the scale is in balance when the momentarily applied power balances the inertia load or breakaway load on the motor, it requires very little additional power to start the motor and keep it running at the desired slow speed—even the weight of a feather applied at one side of the fulcrum of a balanced scale is sufficient (at least theoretically) to unbalance the scale.

Stated in another way, although the voltage dropping resistance is in the motor circuit whenever the firing angle of the SCR's 30–32 is 160°, so that the power delivered to the motor may be reduced to a level below that which can be reliably reached by merely increasing the firing angle of an SCR, by shunting the dropping resistance with a capacitor the impedance introduced into the motor circuit by the resistance is removed for a split second during each half-cycle. Each power pulse thus might be characterized as a hammer blow followed by a short steady push.

As will no doubt be appreciated, if the fixed voltage dropping resistor 34 is replaced with a rheostat 80 of equal value, as shown in FIGURE 3, the low speed motor torque can be adjusted.

FIGURE 3 also illustrates how the circuit may be controlled by a number of different factors or conditions acting in concert or individually. This desirable flexibility is attained simply by supplanting the single switch 47 with a plurality of motor starting and direction controlling switches 47, 47a and 47b, connected into the circuit as shown in FIGURE 3; and by providing the additional variable resistors 50a, 50b, 62a and 62b for the phase shifting or phase lag circuits associated with SCR's 30 and 32. By this added control over the firing angle of SCR's 30–32, the system can be made responsive to a number of factors acting in concert, in which event it is the algebraic sum of the various controlling factors that governs the response of the motor. To illustrate, while one of the motor starting and direction controlling switches may be in a position calling for forward rotation of the motor at X speed, another switch could be in a position to countermand that order and call for the motor to run in the opposite direction at X+ speed. The net result would be rotation in the reverse direction, but at some speed between X and X+.

From the foregoing description taken with the accompanying drawings, it will no doubt be readily apparent to those skilled in the art that this invention provides a very significant improvement in SCR circuits for power control purposes. It should also be understood that while the invention resulted from the need for providing a better control for D.C. reversible motors, it is not limited to that use, but on the contrary has a much wider utility. Any situation in which it is important to have precise and reliable control over the delivery of electric power throughout a very wide or broad range, will be benefited by this invention, Thus, to summarize, while the motivating objective of the invention was an improved motor control circuit using SCR's as the current regulating media, the invention has a much greater scope since it provides a power control circuit that is usable wherever it may be necessary to apply precisely controlled electric power over a very wide range.

What is claimed as my invention is:

1. A full wave reversible phase-controlled motor drive circuit of the type having means including a first SCR for varying the amount of power supplied to operate said motor in one direction of rotation, and means including a second SCR for varying the amount of power supplied to operate said motor in the opposite direction of rotation, said drive circuit being characterized by:
- (A) a dropping resistance for connection in series with the armature of the motor to be controlled;
- (B) a third SCR having its anode-cathode path connected to shunt said dropping resistance;
- (C) means for applying a predetermined triggering potential to the gate electrode of said third SCR;
- (D) a fourth SCR having its anode-cathode path connected to shunt said dropping resistance in opposition to said third SCR; and
- (E) means for applying a predetermined triggering potential to the gate electrode of said fourth SCR.

2. A control circuit for controlling the amount and polarity of unidirectional current supplied to a D.C. motor from a source of such current, comprising:
- (A) a pair of parallel circuits each including an SCR having anode, cathode and gate electrodes, and each being adapted to connect the motor with the source of unidirectional pulsating current through the anode-cathode path of its SCR when the SCR is fired and becomes conductive,
  the amount of current thus delivered to the motor being determined by the firing angle at which the SCR is fired, the SCR's being connected in their respective circuits in opposed relation to one another so that the polarity of the current supplied to the motor is determined by which of the two SCR's is fired;
- (B) a plurality of adjustable phase lag circuits connected with the gate electrode of each SCR, each operable when energized to cause its associated SCR to fire and deliver current in an amount depending upon the firing angle for which the energized phase lag circuit is adjusted; and
- (C) a plurality of independently operable switches, each connected between the source of unidirectional pulsating current and one of the phase lag circuits to control energization of said circuits,
  so that the algebraic sum of the effects of the energized phase lag circuits determines the amount and polarity of the current delivered to the motor with the result that the direction in which the motor runs and the speed thereof may be determined by closure of any one of said switches or any number thereof at the same time.

References Cited

UNITED STATES PATENTS

| | | | |
|---|---|---|---|
| 3,184,670 | 5/1965 | Reynolds | 307—252 XR |
| 3,237,073 | 2/1966 | Bartley et al. | 307—252 XR |
| 3,274,397 | 9/1966 | Heckman et al. | 307—252 |
| 3,277,362 | 10/1966 | Elliott | 307—252 XR |
| 3,287,576 | 11/1966 | Motto | 307—252 XR |
| 3,299,347 | 1/1967 | Torii | 307—252 XR |
| 3,304,487 | 2/1967 | McCaskey | 307—252 XR |
| 3,341,759 | 9/1967 | Torii | 318—422 |
| 3,250,978 | 5/1966 | Moscardi | 318—345 |
| 3,241,024 | 3/1966 | Schade et al. | 318—345 X |
| 3,223,911 | 12/1965 | Seiler et al. | 318—345 X |
| 3,222,585 | 12/1965 | Lobb | 318—345 X |
| 3,214,667 | 10/1965 | Foster et al. | 318—345 |

ORIS L. RADER, *Primary Examiner.*

G. R. SIMMONS, *Assistant Examiner.*

U.S. Cl. X.R.

307—252; 318—507; 323—24, 96